May 28, 1935. J. G. BAKER 2,003,031
CAPACITOR MOTOR
Filed June 21, 1933 3 Sheets-Sheet 1
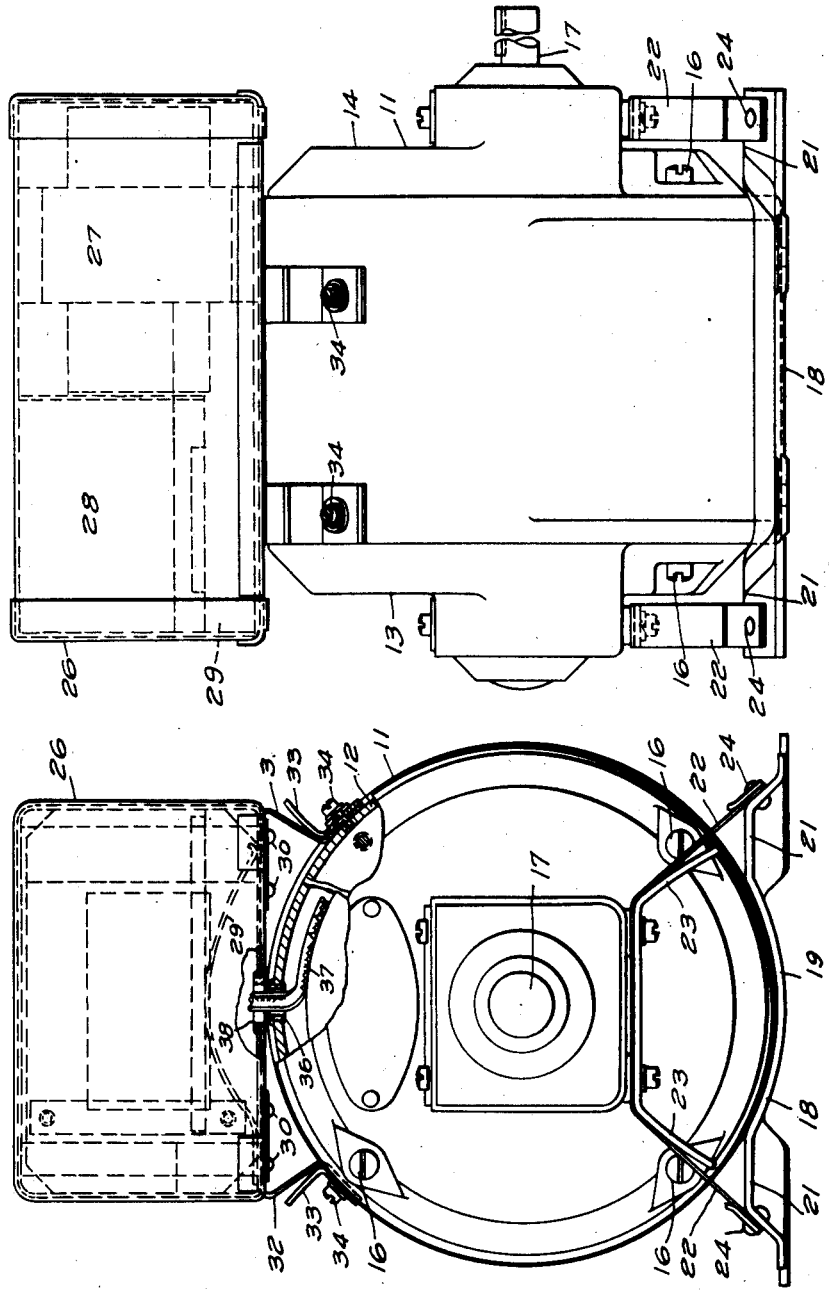
WITNESSES:
E. A. McCloskey
N. M. Biebel
INVENTOR
John G. Baker.
BY W. R. Coley
ATTORNEY May 28, 1935. J. G. BAKER 2,003,031
CAPACITOR MOTOR
Filed June 21, 1933 3 Sheets-Sheet 2
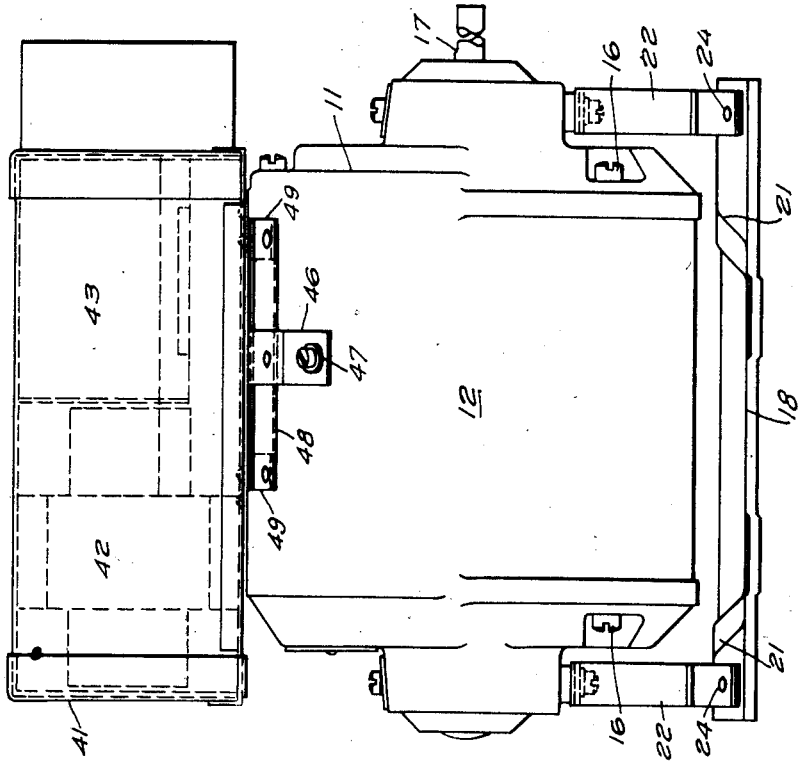
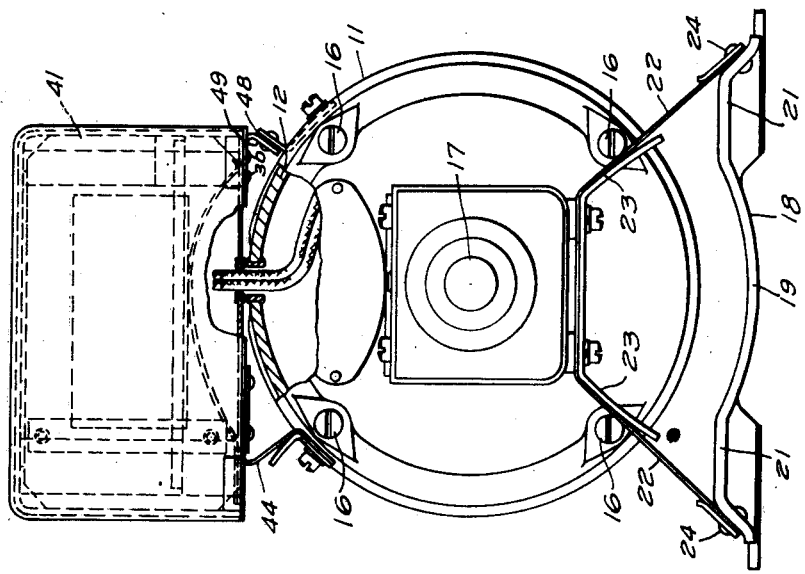
WITNESSES:
E. A. McClaskey
H. M. Biebel
INVENTOR
John G. Baker.
BY
W. R. Coley
ATTORNEY May 28, 1935.  J. G. BAKER  2,003,031
CAPACITOR MOTOR
Filed June 21, 1933  3 Sheets-Sheet 3
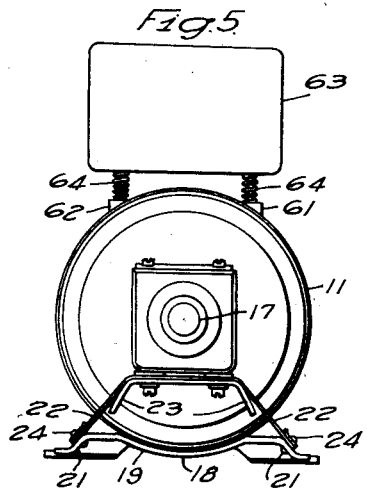
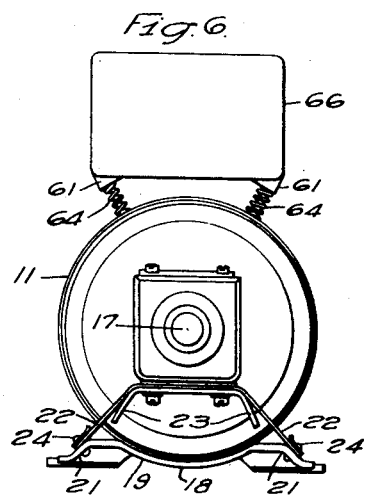
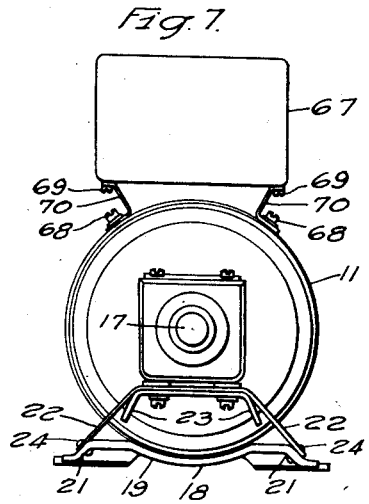
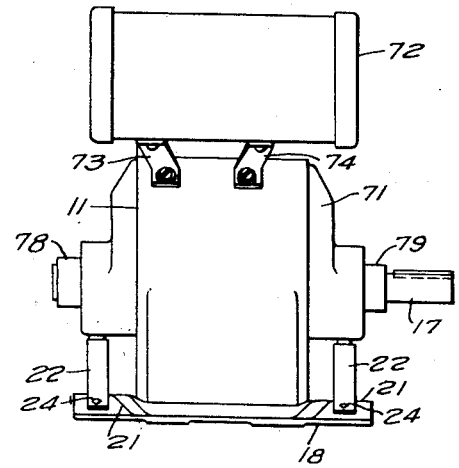
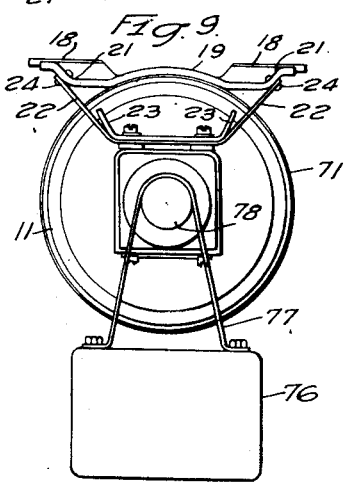
INVENTOR
John G. Baker
BY
W. R. Coley
ATTORNEY
WITNESSES:
E. A. McCloskey
H. M. Biebel Patented May 28, 1935

2,003,031

UNITED STATES PATENT OFFICE 2,003,031

CAPACITOR MOTOR

John G. Baker, Pittsburgh, Pa., assignor to Westinghouse Electric & Manufacturing Company, East Pittsburgh, Pa., a corporation of Pennsylvania Application June 21, 1933, Serial No. 676,827

14 Claims. (Cl. 172—233)

My invention relates to motors and particularly to capacitor motors.

An object of my invention is to provide a relatively simple and compact assembly for a capacitor motor.

Another object is to provide a resilient support for a condenser relatively to a motor subjected to torsional vibrations during operation.

Another object of my invention is to provide a capacitor motor assembly in which the motor is resiliently supported from a base, and in which the condenser is resiliently supported from the motor, and in which, also, the center of mass of the motor assembly is in the axis of the motor shaft.

Another object of my invention is to provide a capacitor motor assembly in which a condenser is mounted on or supported by the motor in such manner that the motor may oscillate around its shaft axis while the condenser remains substantially stationary.

Another object of my invention is to provide a capacitor motor assembly in which the motor proper shall be free to vibrate or oscillate torsionally or peripherally without transmission of such vibrations to either the base supporting the motor or to the condenser supported by the motor.

In practicing my invention I provide a condenser operatively associated with a motor, the condenser being supported on the motor by resilient members which have vibration-limiting means associated therewith. The motor may also be mounted on resilient supports on a base so that it will be free to vibrate or oscillate peripherally without transmission of such vibrations to either the base or to the condenser.

In the drawings:

Figure 1 is a view mainly in end elevation of a motor assembly embodying my invention, certain portions of the motor being cut away;

Fig. 2 is a view in side elevation of the assembly shown in Fig. 1 of the drawings;

Fig. 3 is a view mainly in end elevation of a modified form of device embodying my invention, certain portions of the motor being cut away;

Fig. 4 is a view in side elevation of the assembly shown in Fig. 3 of the drawings;

Fig. 5 is an end view of a motor assembly embodying one form of my invention;

Fig. 6 is an end view of another modification embodying my invention;

Fig. 7 is an end view of another modification embodying my invention;

Fig. 8 is an end view of another modification embodying my invention; and

Fig. 9 is an end view of still another modification embodying my invention.

Referring first to Figs. 1 and 2 of the drawings, I have there illustrated a motor designated generally by the numeral 11, and which includes the usual housing 12, which, as shown more particularly in Fig. 1 of the drawings, is substantially circular in contour, although this element constitutes no part of my present invention. The housing 12 has associated therewith bearing brackets 13 and 14 which may be suitably secured against the ends of the housing, as by a plurality of bolts 16, in a manner well known in the art.

While no particular details of a stator, a stator winding, and a rotor are shown, it is to be noted that all of these are provided, the rotor being mounted on a rotor shaft 17. The design of the stator winding is such as to include a main winding as well as an auxiliary winding, a condenser being electrically connected in circuit with the auxiliary winding in a manner well known in the art.

In motors of this general type, that is, in alternating-current motors of the kind energized from a single-phase source of supply of electric energy, there is a tendency for the motor, or more particularly the motor housing and the stator, to oscillate or vibrate torsionally or peripherally around the axis of the shaft. This is, as is well known, because of the variable-torque supply of electric energy for causing rotation of the rotor of the motor. In the case of motor-driven domestic appliances, it is highly undesirable to permit the transmission of such vibrations to extend to a supporting base, particularly in those cases where the motor-driven appliance may be located on one of several floors, as may happen in the case of such appliances being used in apartment houses.

In order to prevent the transmission of such vibrations to the support and to simultaneously reduce the noise, I prefer to mount a motor of this kind, by resilient means, from a base, which base is indicated by the numeral 18 in Figs. 1 and 2 of the drawings. This base may consist of punched and shaped sheet metal, or it may consist of a casting which may be, in general, of the shape shown in Figs. 1 and 2 of the drawings. In order that the distance of the axis of shaft 17 may be made as small as possible above the bottom face of the base, there is provided an arcuate depression 19 in the mid-portion of the base 18.

At each end of the base 18, there are provided raised portions 21, to which are rigidly secured the end portions of spring members 22, of substantially U-shape. These springs do not constitute any part of my present invention, but are described as they are shown in the drawings. One of the essential elements of this resilient support is that the leg portion of spring members 22 is extended substantially radially of the axis of the shaft 17. The intermediate portion of members 22 is rigidly secured against a part of the motor, and in the drawings they are shown as being rigidly secured against the bearing housing constituting an integral part of the end brackets 13 and 14, respectively. Movement-limiting members are provided cooperating with resilient supports 22, these members being indicated by numeral 23 and being of substantially shallow U-shape and of heavier metal. Any suitable or desired means of securing the ends of springs 22 to the base may be used, these securing members being indicated as rivets 24. This support of the motor by resilient means constitutes no part of the present invention.

I have illustrated a condenser assembly as being mounted in a suitable casing 26, which may be of any desired construction, and in which may be located a transformer 27 and a condenser 28, which may be held in proper operative and relative positions in casing 26 by any suitable or desired means, which means may include a bowed spring 29 to bias the condenser in one direction and against one wall of casing 26. The use of a transformer in applications of this kind is, of course, well known, but it may be noted here that it is used to provide a higher voltage at the terminals of the condenser 28 than that which is available in the circuit of the auxiliary or secondary stator winding.

It is desirable, if not necessary, that the condenser and its cooperating transformer be resiliently mounted on the motor so that the motor will not only be free to vibrate peripherally or torsionally around its shaft axis, but also so that the center of gravity of the rigid motor assembly will still be substantially at the center, or the axis, of the rotor shaft. It may be briefly noted that if the center of gravity of such a motor were not located at substantially the axis of the rotor shaft, even limited rotation of the motor frame about the motor axis, caused by torsional forces, would result in a translation of the center of gravity of the motor frame with consequent forced reaction at the motor base, which would be likely to produce vibration of both motor and base and consequent noise.

I, therefore, provide resilient supporting or mounting means in the shape of a pair of roughly Z-shaped leaf springs 31 and 32, one end of each of which is rigidly secured against the housing 12 of motor 11, while the other end of each of these leaf springs is rigidly secured to the under side of condenser box or casing 26, by rivets 30, for example. The same requirement holds with regard to the location of the springs 31 and 32, as was hereinbefore noted in regard to springs 22, namely, that they shall be located in planes which extend substantially radially to the axis of shaft 17. In the drawings two of these leaf springs 31 and 32 are shown on each side of the casing 26, although it will be understood that my invention is not limited to any particular number.

In order that the optimum conditions of operation shall be obtained, it is necessary that these flexible connecting supports be flexible enough so that the highest natural frequency of rotation of these parts about the motor axis shall be much lower than the lowest frequency of the torque variations, the reaction of which it is desired to prevent. In the case of a 60-cycle source of supply of alternating-current electric energy to a motor, these variations will have a frequency of 120 per second, that is, there will be 120 pulsations per second, and in accordance with the above-mentioned requirement the design and construction of the spring members 31 and 32 is such that their natural period of vibration will be well below the value of 120 pulsations per second.

In order to prevent excessive vibration, should such occur, I provide stop members 33 operatively associated with the springs 31 and 32, these members being in the shape of short pieces of metal of substantially L-shape. A screw or bolt 34 may be used to clamp one of the members 33 and one end of springs 31 or 32 to motor housing 12. The free ends of members 33 are normally out of engagement with springs 31 and 32.

The housing 12 may be provided with an opening at its top portion in which a bushing 36, of electric insulating material is fitted, and through which a plurality of leads 37 may extend from the stator winding to the condenser assembly in the casing 26. The bottom wall of casing 26 may be provided with an opening in which is fitted a bushing 38 of electric insulating material, the conductors 37 extending upwardly through this bushing. I prefer to make the inner diameter of bushing 38 slightly larger than the inner diameter of bushing 36 in order that there shall be no cramping or binding of the group of conductors 37 during operation of the motor when it may be subjected to peripheral vibrations, as hereinbefore set forth.

While the design shown in Figs. 1 and 2 is particularly applicable where the condenser may be mounted symmetrically relatively to the motor housing, this may not always be possible, particularly in those cases where the motor may have to be fitted into a particular space, such as, for instance, below the tub of a washing machine, or some such similar appliance. In this case a slightly different form of construction of resilient support may be utilized, and this has been shown in Figs. 3 and 4 of the drawings. As the motor proper and its support are identical, they have been given the same numerals and will not be again described in detail.

A casing 41 contains a transformer 42 and a condenser 43, which casing is to be mounted above the motor 11. As it is necessary, in this case, that the casing be offset relatively to the vertical center line of the motor, the resilient supporting members for the condenser are of two different shapes. At one side I provide preferably two leaf springs 44 whose ends are rigidly secured to the motor housing 12 and the casing 41, these leaf springs and their method of attachment being substantially the same as was hereinbefore described for members 31 and 32 of Figs. 1 and 2. At the other side I provide a relatively rigid member 46 of substantially L-shape, one leg portion of which is bolted against, or secured to, housing 12, as by a short machine screw 47, while its other leg portion is rigidly secured to a substantially horizontally extending leaf spring 48, whose outer ends have secured thereto link members 49 of substantially L-shape. These link members 49 have their other ends rigidly secured to the condenser casing 41 as by rivets 30. In this case, also, an essential consideration is that spring members 44 as well as spring member 48 shall have one face thereof extending substantially radially with respect to the rotor shaft 17. In all other respects, the construction of the assembly shown in Figs. 3 and 4 is substantially the same as that shown in Figs. 1 and 2.

Installations of motors of this kind have shown that the spring supports for the condenser fully meet the requirements originally made of them, namely, to so support the condenser that it will remain substantially stationary in space relatively to its vibrating or oscillating support. It may be noted further that the location of the condenser assembly on the outside of a motor of this kind permits of relatively free and easy access to the conductor assembly, should this become necessary, because of damage to or the occurrence of a fault in such assembly.

While a number of motors embodying either one or the other of the constructions shown in Figs. 1 to 4 inclusive have been built and operated, my invention is not limited thereto as it may also be embodied in other structures by which a condenser is supported on or from a motor frame in such manner that the motor itself may oscillate freely around the axis of its shaft while the condenser assembly, preferably mounted in a casing, remains substantially stationary or in a fixed position.

Modifications of the structures shown in Figs. 1 to 4 inclusive, which are effective for the same purpose, are shown in Figs. 5 to 9, inclusive, in which I have illustrated a motor assembly 11 mounted on a base 18 by the hereinbefore described spring structures 22 and I have, therefore, designated the motor, the base and the spring support as well as the movement limiting means by the same numerals. This holds true particularly for Figs. 5 to 7, inclusive.

Referring to Fig. 5 of the drawings, the motor housing proper is provided with supporting lugs 61 and 62 of which there are two of each aligned axially of the motor housing and located near the axial ends of the casing. A condenser casing 63 within which is located a condenser and a transformer (neither of which are shown in this figure of the drawings) is resiliently mounted on and supported from the assembly 11 as by helical springs 64, of which four are used. These helical springs need not necessarily extend radially of the axis of the shaft or lie in planes which extend substantially radially of the axis of the shaft, inasmuch as these springs are resilient in a plurality of directions. No connecting leads for the motor proper or between the motor and the condenser casing 63 are shown, these having been omitted for the sake of simplicity. However, it is to be understood that the same connecting leads and bushing structures therefor may be used as are shown and described in connection with Figs. 1 to 4, inclusive.

Referring now to Fig. 6 of the drawings, I have there illustrated a condenser casing 66 which is yieldingly supported from a motor assembly 11 by four helical springs 64, each pair of which, spaced apart peripherally of the frame or housing of the motor, lie in planes extending substantially radially of the axis of the motor shaft. In all other respects the construction is the same as was described for the assembly in Fig. 5 of the drawings, and while no securing means for the respective ends of the springs 64 have been shown, it is to be understood that any suitable means may be utilized to rigidly secure the ends of the spring 64 to the motor housing and to the condenser casing.

Referring now to Fig. 7 of the drawings, I have there illustrated a motor assembly 11 upon which is mounted a condenser casing 67 which is supported on and spaced from the motor assembly 11 by two pairs of relatively short resilient wire members 70 which are of such construction as to meet the requirement hereinbefore discussed of having a relatively low inherent period of vibration. The ends of the pairs of wires, which lie in planes extending substantially radially of the motor shaft, are rigidly secured to the motor housing and to the condenser casing respectively, by means here shown as machine screws 68 and 69, respectively.

Fig. 8 of the drawings shows a motor assembly 71 which is, in general, of substantially the same kind as illustrated and described in Figs. 1 to 4, inclusive, and a condenser casing 72 is mounted thereabove by resilient flat springs of substantially the same kind as is shown in Figs. 1 and 2 of the drawings, the exception being that the leaf spring 73 and 74 extend away from each other or diverge upwardly and outwardly, as shown, that is, it is not necessary that these springs be parallel to each other throughout their major axis.

Referring now to Fig. 9 of the drawings, I have there illustrated a motor assembly 71 which may be provided with a base 18 and flat leaf spring supports 22 as hereinbefore described, but in which the motor is adapted to be mounted on the ceiling of a chamber or on the underside of some support.

In this particular case, a condenser casing 76 may be suspended from the motor by relatively long straps of metal strip 77 which may be of substantially U-shape, the intermediate portion being rounded to fit upon extensions 78 and 79 of motor assembly 71, as shown in Figs. 8 and 9 of the drawings. It is, of course, to be understood that two such members 77 will be used, one at each bearing bracket and no more or less rigid connection between the support 77 and the motor assembly 71 is necessary. The condenser casing 76 and the elements located therein are, therefore, free to swing on the supporting portions 78 and 79, being restrained only by the friction between the metal straps 77 and the corresponding arcuate surfaces of members 78 and 79 supporting the straps 77.

I wish to again point out that while Figs. 1 to 4, inclusive, show structures that have been embodied in actually constructed designs, my invention is not limited thereto and may also be practiced in any one of the forms shown in Figs. 5 to 9, inclusive.

Various further modifications may be made in the device embodying my invention without departing from the spirit and scope thereof, and I desire, therefore, that only such limitations shall be placed thereon as are imposed by the prior art or are set forth in the appended claims.

I claim as my invention:

1. In combination with a motor subject to oscillations around the axis of its shaft and a condenser, means supporting the condenser upon the motor to enable the motor to oscillate around its shaft axis while the condenser remains substantially stationary.

2. In combination with a motor subject to peripheral oscillations around its shaft axis, a condenser and resilient flat bars having portions lying in planes substantially radial to the axis of the motor shaft for supporting the condenser on the motor.

3. In combination with a motor having a shaft and subject to peripheral oscillations and a condenser, resilient members lying in planes extending substantially radially of the shaft axis, and means for connecting the motor and condenser to said members to support the condenser on the motor.

4. In combination with a motor having a shaft and subject to peripheral oscillations and a condenser, peripherally spaced means lying in planes extending substantially radially of the shaft axis and resilient in a direction at right angles to said planes connecting the motor and the condenser to enable the motor to oscillate around its shaft axis while the condenser remains substantially stationary.

5. In combination with a motor housing, a condenser supported thereby and resilient supporting means for the condenser connecting the condenser and the motor.

6. In combination with a motor housing, a condenser and resilient means extending substantially radially of the axis of the motor for supporting the condenser from the motor housing.

7. In combination with a motor, a condenser mounted upon the motor at the top thereof, and bars of resilient material lying in planes extending substantially radially of the axis of the motor for supporting the condenser on the motor.

8. In combination with a motor having a shaft and subject to peripheral vibration, a condenser, and peripherally spaced resilient bars lying in planes extending substantially radially of the shaft axis supporting the condenser on the motor.

9. In combination with a motor having a shaft and subjected to peripheral vibrations, a condenser mounted on the motor frame, spaced resilient members lying in planes extending substantially radially of the motor shaft between the condenser and the motor to support the condenser on the motor, and means adjacent each resilient member for limiting the turning movement of the resilient supports.

10. In combination with a motor subjected to peripheral vibration, a condenser, and peripherally spaced resilient bars having their ends secured rigidly to the motor and to the condenser, respectively, and extending in planes substantially radially of the motor axis, the natural period of vibration of the condenser being lower than the period of vibration of the motor.

11. In combination with a motor having a rotor shaft, and subject to peripheral vibration, a base, resilient means extending between the base and the motor to support the motor on the base, a condenser, and resilient means supporting the condenser on the motor, both of the resilient supporting means being adapted to permit the motor to oscillate around its shaft axis while the base and the condenser remain substantially stationary.

12. In combination with a motor subject to torsional vibration, a resilient support therefor enabling said motor to vibrate torsionally, a condenser operatively associated with the motor, and spring means supporting the condenser from the motor to hold the condenser in substantially fixed position irrespective of the motor vibrations.

13. A device as set forth in claim 12 in which the condenser supporting means includes two spaced leaf springs lying in planes extending substantially radially of the motor axis.

14. A device as set forth in claim 12 in which the condenser supporting means includes two spaced leaf springs lying in planes extending substantially radially of the motor axis, each spring having its ends rigidly secured respectively to the motor and to the condenser.

J. G. BAKER.